Patented Nov. 1, 1938

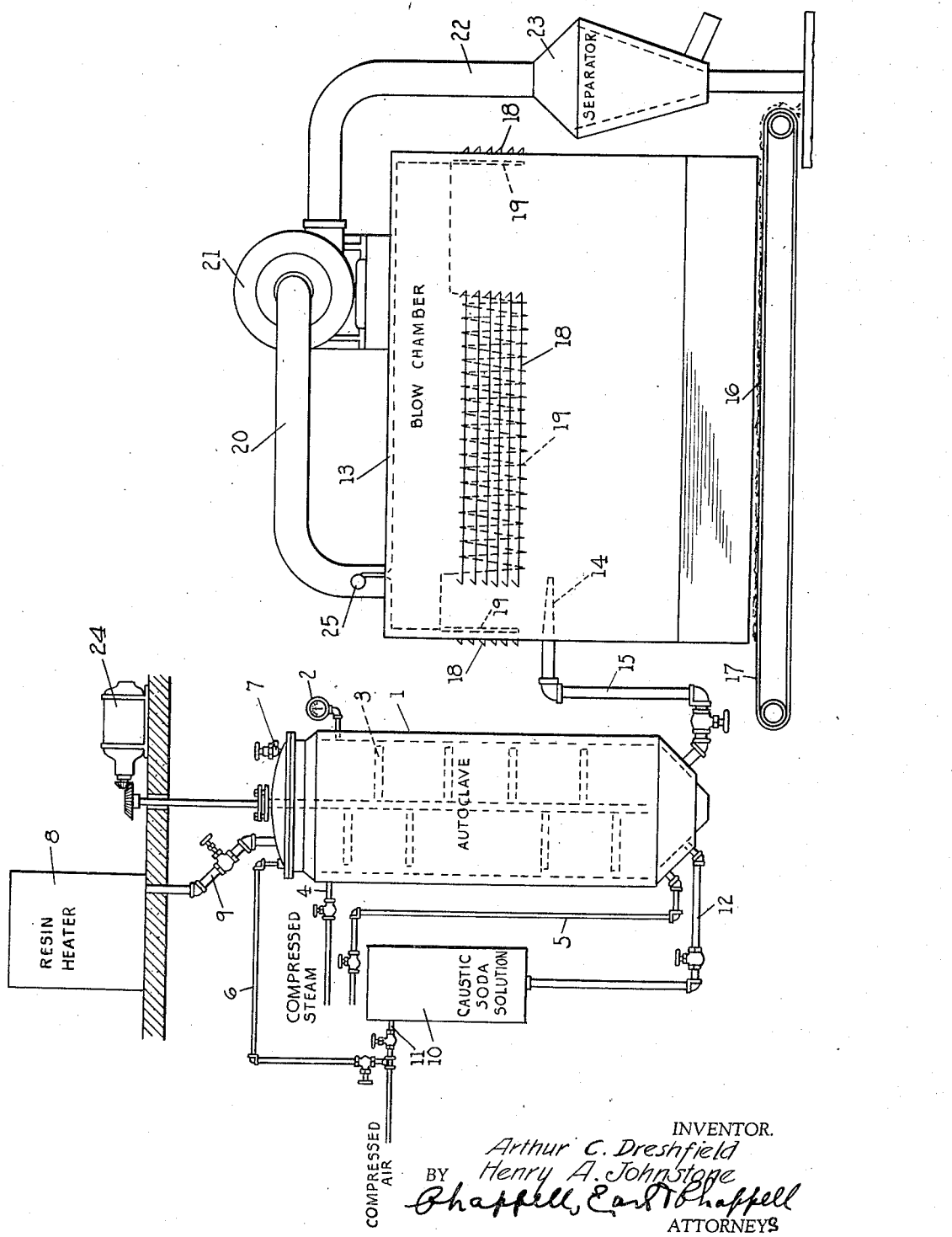

2,134,912

UNITED STATES PATENT OFFICE 2,134,912

ROSIN SIZE

Arthur C. Dreshfield, Kalamazoo, Mich., and Henry A. Johnstone, Savannah, Ga., assignors, by mesne assignments, to Hercules Powder Company, Wilmington, Del., a corporation of Delaware Original application May 11, 1935, Serial No. 21,024. Divided and this application March 2, 1936, Serial No. 66,690

6 Claims. (Cl. 134—21)

This invention relates to improvements in rosin size.

This application is a division of our application Serial No. 21,024, filed May 11, 1935.

This invention relates to improvements in rosin paper size, and more particularly the invention relates to a rosin size consisting of discrete particles having a porous cellular structure and characterized by their rapid solubility in cold water and freedom from volatile organic matter.

Generally speaking, the paper size in accordance with our invention comprises a reaction product of abietic acid, or equivalently of rosin, and caustic alkali, the reagents being reacted in proportions such that the rosin size product is free or substantially free of saponifiable substance, i. e., more particularly, free or substantially free of unsaponified rosin and/or excess or unreacted caustic alkali.

The rosin size product in accordance with our invention is more specifically characterized by the fact that it is in the form of non-tacky, discrete particles having a cellular structure rendering them porous, and a minimum moisture content. The rosin size product is essentially dry and at the same time, by virtue of its characteristic indicated and more particularly by virtue of the cellular structure of the discrete particles, is rapidly and completely soluble in cold water.

The rosin size in accordance with our invention is of substantial advantage from the practical standpoint inasmuch as it will not deteriorate in shipment or storage and can be packed in paper bags, and inasmuch as it may be dissolved in water rapidly and easily without the necessity for heating, mechanical agitation, or other aids heretofore found necessary in dissolving rosin sizes.

The process for producing the rosin size of our invention, generally speaking, involves the saponification of abietic acid or rosin with caustic alkali and on completion of the saponification, discharging the superheated reaction mass into an atmosphere maintained at a relative humidity below or about 78%, it having been found that a relative humidity of below or about 78% is critical for the production of a rosin size having the characteristic of substantial dryness or low moisture content possessed by the rosin size contemplated by our invention. In other words, the rosin size in accordance with our invention can be produced where the reaction mass is discharged into an atmosphere having a relative humidity below about 78%. By "relative humidity" we mean the weight of water vapor, expressed as a percentage, contained in a given volume of air, divided by the weight which would be contained in the same volume of saturated air at the same temperature.

For preferred operation, the relative humidity is maintained about or below 72% and this secures very satisfactory results. As the relative humidity rises above this, less desirable results are secured and when the relative humidity exceeds 78% or 80%, the dry matter decreases rapidly, and therefore, we recommend and in practice aim to maintain the relative humidity at about 72% or below. Superheat or superheating is used here as indicating a liquid heat above its boiling point without converting it into vapor, as results in the method hereinafter detailed.

More particularly, the method in accordance with our invention comprises discharging the superheated saponified abietic acid or rosin under pressure into an enclosed chamber, through which air maintained at a relative humidity below or about 78%, which is critical, is circulated. Various more specific details comprised in the process in accordance with our invention will appear from the more detailed description thereof hereinafter.

The apparatus employed in producing the size of our invention from the broad standpoint comprises a combination of elements wherein the saponification of abietic acid or rosin with caustic alkali is effected for superheating it under pressure, for discharging the reaction mass, for receiving the discharged size and for insuring the maintenance of the relative humidity of the atmosphere into which the reaction mass or size is discharged at or below about the critical relative humidity of 78%.

Further and more specific details of the apparatus will be made apparent from the detailed description of a preferred embodiment thereof hereinafter.

Having thus indicated in a general way the nature and purpose of this invention, we will proceed to a more detailed description thereof with reference to the accompanying drawing, wherein:

The signal figure is a fragmentary view in side elevation of an apparatus adapted for the carrying out of our process for the production of the product.

Referring to the drawing, 1 indicates an autoclave provided with a pressure gauge 2 and an agitator 3 driven as shown from a motor 24. The autoclave is jacketed, the jacket being connected with a supply of heating medium, preferably steam, through a conduit 4 and with an outlet conduit 5. The top of the autoclave is also connected with a supply or source of air under pressure through a conduit 6 and with a relief valve 7. The autoclave is adapted for reacting abietic acid or rosin with a solution of caustic alkali for the production of a rosin size.

Suitably supported above the autoclave is a tank 8 adapted to hold a supply of rosin. The tank 8 is formed with a heating medium jacket or provided with steam coils (not shown) whereby rosin supplied to the tank 8 may be melted and maintained in a molten condition. The tank 8 is connected to the autoclave by means of a valved conduit 9, by which molten rosin in a predetermined batch or quantity may be run into the autoclave. Adjacent the autoclave is positioned a tank 10 adapted to contain a supply of caustic soda solution. The tank 10 is connected with a supply or source of air under pressure through a valved conduit 11 and the tank is also connected with the bottom of the autoclave by a valved conduit 12. It will be noted that caustic soda solution in tank 10 may be discharged into the autoclave by means of air pressure admitted to tank 10 through conduit 11.

An enclosed blow chamber 13 has projecting into it a discharge nozzle 14. The nozzle is connected through a valved conduit 15 with the bottom of the autoclave. The bottom of the chamber 13 is preferably formed in a V shape and is provided with a longitudinal opening at its low point through which the product 16 collecting in the chamber falls upon a conveyor belt 17 by which the product is carried to a convenient place for packing or storage.

The blow chamber 13 is provided with means for the admission of air, such, for example, as louvers 18, adjacent which are positioned heating elements 19 adapted to be connected to a suitable source of heat, as for example, steam. Alternatively, the heating elements may be replaced by electrical heating elements or the like, by which the temperature of the air entering the chamber 13 may be raised.

From the top of the chamber, a conduit 20 leads to the suction side of a suitably driven exhaust blower 21 by which air is drawn through the chamber. The discharge from the blower 21 is connected to a conduit 22 leading to a separator 23. In the conduit 20, through which, as has been indicated, air is drawn from the chamber by the blower 21, and preferably adjacent the point of connection of the conduit 20 with the chamber, is placed a humidostat 25, adapted to respond to the relative humidity of the air leaving the chamber 13. By any suitable arrangement, electrical or otherwise, the humidostat 25 is arranged to control the temperature of the air entering the chamber through the louvers 18 by control of the heating elements 19. An air dehydrating means might be employed, but the apparatus as illustrated is highly practical.

The heating of the incoming air into the blow chamber is not for the purpose of heating the air, but merely for the purpose of maintaining the desired degree of relative humidity. In practice, it is preferred that the temperature of the air passing through the blow chamber shall not exceed 160° F. for best results and in any event it should be well below the temperature of the saponified resin discharged into the chamber. For the plant or apparatus described, the volume of air drawn through the blow chamber should at least be 1200 cubic feet per minute.

With respect to the apparatus above described it will be appreciated that the apparatus may comprise a single autoclave and means of discharge, in which case the chamber 13 will be of suitable size relative to the capacity of the autoclave, or a plurality of autoclaves and means of discharge may be associated with a single chamber of a size relative to the combined capacity of the autoclaves, or the several reaction means may be manipulated to effect a continuous discharge to the chamber.

A typical installation, for example, may comprise a series of five autoclaves arranged in line adjacent one end of a drying chamber, each autoclave being provided with a discharge nozzle within the chamber. In such an installation, assuming that the combined capacity of the autoclaves is five tons of finished product per charge, the chamber 13 should be about fifty feet long, thirty feet wide and forty feet high, and desirably the walls of the chamber are insulated in order to avoid loss of heat therethrough.

In the operation of the apparatus in accordance with our invention, as detailed above, for the carrying out of the method in accordance with our invention, molten rosin from the tank 8 is run into the autoclave 1. The rosin is heated to a temperature of about 275° F. before its introduction into the autoclave, and the autoclave, through the introduction of heating medium through conduit 4 into its jacket, is brought to a similar temperature. The tank 10 contains an aqueous solution of caustic soda of a concentration within about the range of 25% to about 50% (preferably 40%) caustic soda, by weight, and the solution in tank 10 is brought to a temperature of about 220° F. to 275° F. by any suitable means, such as a steam coil (not shown) within the tank.

Molten rosin in a desired quantity having been introduced into the autoclave, an amount of caustic soda solution containing an amount of caustic sufficient to saponify the amount of rosin previously introduced into the autoclave is then blown into the bottom of the autoclave through conduit 12, by the introduction of air under pressure into the tank 10, through conduit 11. The amount of caustic soda is such that on completion of saponification the product does not contain in excess of about 2.5% free rosin or 0.5% free caustic soda. We find that 12.1% of dry alkali based on dry rosin is preferable for gum rosin and 11.7% for wood rosin, depending upon their saponification number.

The caustic soda solution is blown upwardly through the molten rosin in the autoclave and the agitator 3 in the autoclave is operated to intermingle the rosin and the solution while, at the same time, the temperature within the autoclave is maintained within the range of 275° F. to 375° F. until saponification is completed. During the reaction in the autoclave, a pressure which is due largely to the evolution of steam from the water of the caustic solution at the temperature used is maintained. This pressure is preferably held between 100 pounds and 125 pounds gauge for the temperature stated.

It will be noted that the reaction is carried out in the autoclave under pressure and in the absence of air, i. e., in the presence of the steam and vapor evolved from the reaction mass. When the reaction is complete, the reaction mass or saponified rosin within the autoclave contains about 15% to 20% moisture, it being noted that loss of any substantial amount of moisture is avoided. Hence, hardening and stiffening of the reaction mass is avoided and the latter is in a mobile state due to its moisture content.

On completion of the reaction, the reaction mass is further agitated in the autoclave by means of the agitator to render it homogeneous and then the mass is discharged into the chamber 13 through the nozzle 14, a flattened pipe having been found to be very satisfactory, the discharge being effected under constant pressure through conduit 15 by the introduction of air under pressure at the top of the autoclave through the conduit 6. The discharge pressure is preferably held between 100 pounds and 125 pounds gauge.

Prior to the discharge of the saponified rosin into the chamber 13, the blower 21 is started and a circulation of air through the chamber is set up. It will be noted that air enters the chamber through the louvers 18 and is withdrawn therefrom through conduit 20. As the circulation of air starts, the humidostat 25 responds to the relative humidity of the air. The humidostat, being arranged to control temperature of the air entering the chamber through the louvers 18 through control of the heating elements 19, is adjusted to maintain the relative humidity of the air passing out of the chamber and consequently the air within the chamber at or below 78%.

The saponified rosin is discharged into the chamber 13 in a finely subdivided state. The finely subdivided particles are of a substantially uniform size, and since the interior of the chamber is under atmospheric pressure, there is a sudden reduction in pressure on, and the simultaneous fine subdivision of, the superheated saponified rosin. The moisture therein, due to the superheat of the mass, expands or flashes into steam, and at the same time there is a similar instantaneous and rapid expansion of gases or vapors present in the mass. As a consequence, the finely subdivided particles are dried or relieved of moisture and of volatile products in the form of gases or vapors. Further, as a result of the rapid expansion resulting in the release of moisture and gas or vapors, the finely subdivided particles are given a cellular structure and instantly cooled, which prevents any deleterious action which might result from prolonged exposure to heat.

As the saponified rosin is discharged into the chamber and the finely subdivided particles thereof are relieved of moisture and gases and vapors, the moisture and gases or vapors are carried out of the chamber under the influence of the blower 21 through the conduit 20 and the dry finely divided particles of saponified rosin having a cellular structure fall to the bottom of the chamber and pass to the conveyor belt 17.

The moisture removed from the finely subdivided particles of saponified rosin, which is picked up and carried from the chamber 13 by the air circulating therethrough, tends to increase the relative humidity of the air in the chamber. Increasing the relative humidity of the air in the chamber to a point above about 78% relative humidity causes the humidostat in conduit 20 to exert a control upon the heating elements 19, such that the temperature of the air in the chamber is increased and consequently also the relative humidity of the air in the chamber maintained at or below about 78%.

It will be noted that in practical operation the relative humidity of the air in the chamber 13 is fixed well below the 78% before discharge of saponified rosin thereinto and that the heating elements 19 controlled by the humidostat are arranged so that the relative humidity in the chamber is not at any time permitted to exceed about 78% relative humidity during the discharge of saponified rosin into the chamber.

The air leaving the chamber 13 through the conduit 20 carries some fine particles of the dried rosin size, such particles, however, being recovered in the separator 23 through which the air is discharged.

It will be appreciated that various modifications may be made in the apparatus as detailed above and in the carrying out of the process as detailed above without departure from the scope of our invention.

The procedure in accordance with our invention is of especial advantage in enabling the production of a highgrade size with wood rosin, as for example, FF rosin or even low grade B wood rosin, since the greenish coloring matter of the wood rosin, heretofore carried into the size and paper treated therewith, is violatilized, destroyed, or removed from the size under the conditions of production in accordance with our invention.

It will be appreciated that from the process standpoint our invention comprises essentially discharging and drying superheated saponified abietic acid or rosin in an atmosphere having a relative humidity not in excess of 78%, and that from the apparatus standpoint our invention comprises essentially a combination of elements for the saponification and discharge of abietic acid or rosin and for controlling the relative humidity of the atmosphere in which the saponified abietic acid or rosin is discharged within the limit contemplated by the process.

The rosin size made in accordance with our invention comprises, as has been indicated, discrete particles having a cellular structure rendering them porous. The particles are characterized by the fact that they are non-tacky, by the fact that they are substantially dry or have a moisture content not in excess of about 8%, by their substantial freedom from saponifiable substances—more particularly, no more than 2.5% of unsaponified rosin or 0.5% of caustic alkali—and by their rapid solubility in cold water, and their substantial freedom from volatile organic matter. The product is also characterized by the fact that it comprises abietic acid or rosin saponified with a caustic alkali solution.

By virtue of the fact that the various conditions effecting the result are under control before, during and after discharge, we are able to obtain uniformly a product having the desired properties. We refer to the control of the material in the autoclave and in the drier.

As stated, the size produced by this method is characterized by being free or substantially free of saponifiable substances, is in the form of nontacky discrete particles having a cellular structure rendering them porous and having a minimum moisture content, the size being in effect essentially dry, and is rapidly and completely soluble in cold water. Owing to the fluffy character of the product, it is sometimes compressed in packing for shipment or storage, and while this somewhat modifies its fluffy character, it does not destroy its non-tacky characteristics and its complete solubility, the compressing being merely for the purpose of reducing the volume, as stated.

Having thus described our invention, what we claim as new and desire to secure by Letters Patent is:

1. A dry rosin size comprising a reaction product of rosin and caustic alkali in the form of non-tacky, discrete particles, characterized by a moisture content not in excess of about 8%, by freedom from volatile products, by a cellular structure, by rapid and substantially complete solubility in cold water, by containing not over about 2.5% of unsaponified rosin and not over about 0.5% of free or unreacted caustic soda.

2. A dry rosin size comprising a reaction product of rosin and caustic alkali in the form of non-caking, non-tacky discrete, cellular particles, containing not over 0.5% free alkali and essentially no unsaponified rosin and characterized by porosity, by a moisture content of not in excess of about 8%, by freedom from volatile products and by rapid and substantially complete solubility in cold water.

3. A dry rosin size comprising a reaction product of rosin and caustic alkali in the form of non-caking, non-tacky, discrete, cellular particles, containing not over about 2.5% of unsaponified rosin and essentially no free or unreacted caustic soda, characterized by porosity, by a moisture content of not in excess of about 8%, by freedom from volatile products, and by rapid and substantially complete solubility in cold water.

4. A dry rosin size comprising a reaction product of abietic acid and caustic alkali in the form of non-tacky, discrete particles, characterized by a moisture content not in excess of about 8%, by freedom from volatile products, by a cellular structure, by rapid and substantially complete solubility in cold water, by containing not over about 2.5% of unsaponified abietic acid and not over about 0.5% of free or unreacted caustic soda.

5. A dry rosin size comprising a reaction product of abietic acid and caustic alkali in the form of non-caking, non-tacky, discrete, cellular particles, containing not over 0.5% free alkali and essentially no unsaponified abietic acid and characterized by porosity, by a moisture content of not in excess of about 8%, by freedom from volatile products and by rapid and substantially complete solubility in cold water.

6. A dry rosin size comprising a reaction product of abietic acid and caustic alkali in the form of non-caking, non-tacky, discrete, cellular particles, containing not over about 2.5% of unsaponified abietic acid and essentially no free or unreacted caustic soda, characterized by porosity, by a moisture content of not in excess of about 8%, by freedom from volatile products, and by rapid and substantially complete solubility in cold water.

ARTHUR C. DRESHFIELD.
HENRY A. JOHNSTONE.